United States Patent
Betouin et al.

(10) Patent No.: US 8,051,097 B2
(45) Date of Patent: Nov. 1, 2011

(54) SYSTEM AND METHOD FOR AUTHENTICATION USING A SHARED TABLE AND SORTING EXPONENTIATION

(75) Inventors: Pierre Betouin, Boulogne (FR); Mathieu Ciet, Paris (FR); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 12/334,732

(22) Filed: Dec. 15, 2008

(65) Prior Publication Data

US 2010/0153450 A1 Jun. 17, 2010

(51) Int. Cl.
*G06F 7/00* (2006.01)
*G06F 17/30* (2006.01)

(52) U.S. Cl. ............... 707/781; 726/2; 380/28
(58) Field of Classification Search .......... 707/781; 726/2; 380/28
See application file for complete search history.

(56) References Cited

U.S. PATENT DOCUMENTS

| | | | |
|---|---|---|---|
| 5,349,642 A * | 9/1994 | Kingdon ............... | 713/161 |
| 2005/0015471 A1* | 1/2005 | Zhang et al. ........... | 709/221 |
| 2007/0094392 A1* | 4/2007 | Stone et al. ........... | 709/225 |
| 2008/0005086 A1* | 1/2008 | Moore ................. | 707/3 |
| 2008/0044010 A1* | 2/2008 | Vasyltasov ............ | 380/28 |
| 2008/0263640 A1* | 10/2008 | Brown ................ | 726/5 |
| 2008/0270798 A1* | 10/2008 | Charles et al. ......... | 713/176 |
| 2009/0003593 A1* | 1/2009 | Gopal et al. ........... | 380/30 |
| 2009/0067617 A1* | 3/2009 | Trichina et al. ........ | 380/28 |

* cited by examiner

*Primary Examiner* — John E Breene
*Assistant Examiner* — Joshua Bullock
(74) *Attorney, Agent, or Firm* — Novak Druce + Quigg LLP

(57) ABSTRACT

Disclosed herein are systems, computer-implemented methods, and computer-readable media for authentication using a shared table. The method receives an authentication challenge from a first entity including an accumulator with an initial value, lists of elements in a shared table, and a list of sorting algorithms, each sorting algorithm is associated with one of the lists of elements and modified to include embedded instructions operating on the accumulator. The method then generates a temporary table for each list of elements in the shared table by copying elements from the shared table as indicated in each respective list of elements, each temporary table being associated with one sorting algorithm in the list of sorting algorithms. The method sorts each generated temporary table with the associated sorting algorithm, thereby updating the accumulator with the embedded instructions. Finally, the method transmits the updated accumulator to the first entity for verification.

20 Claims, 3 Drawing Sheets

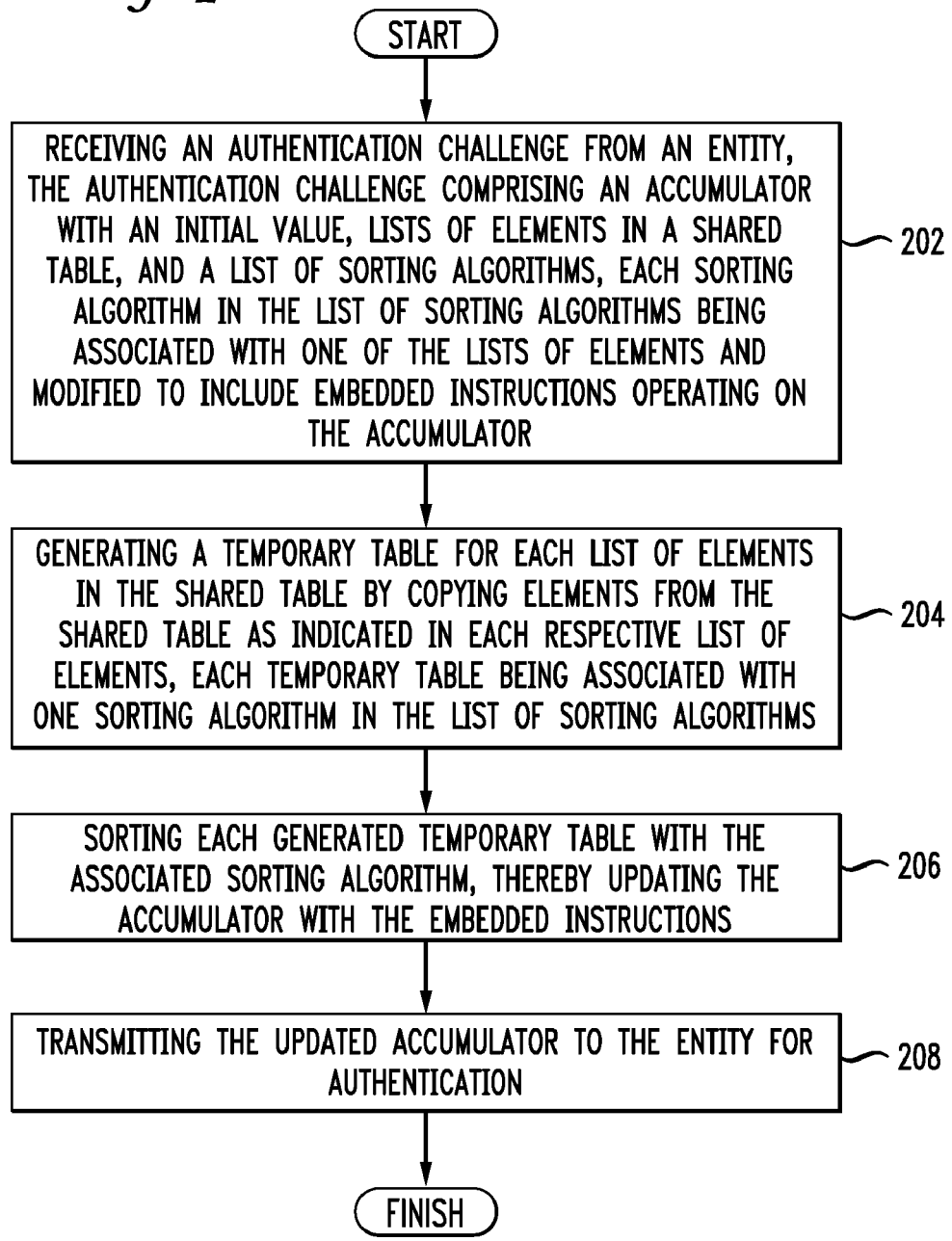

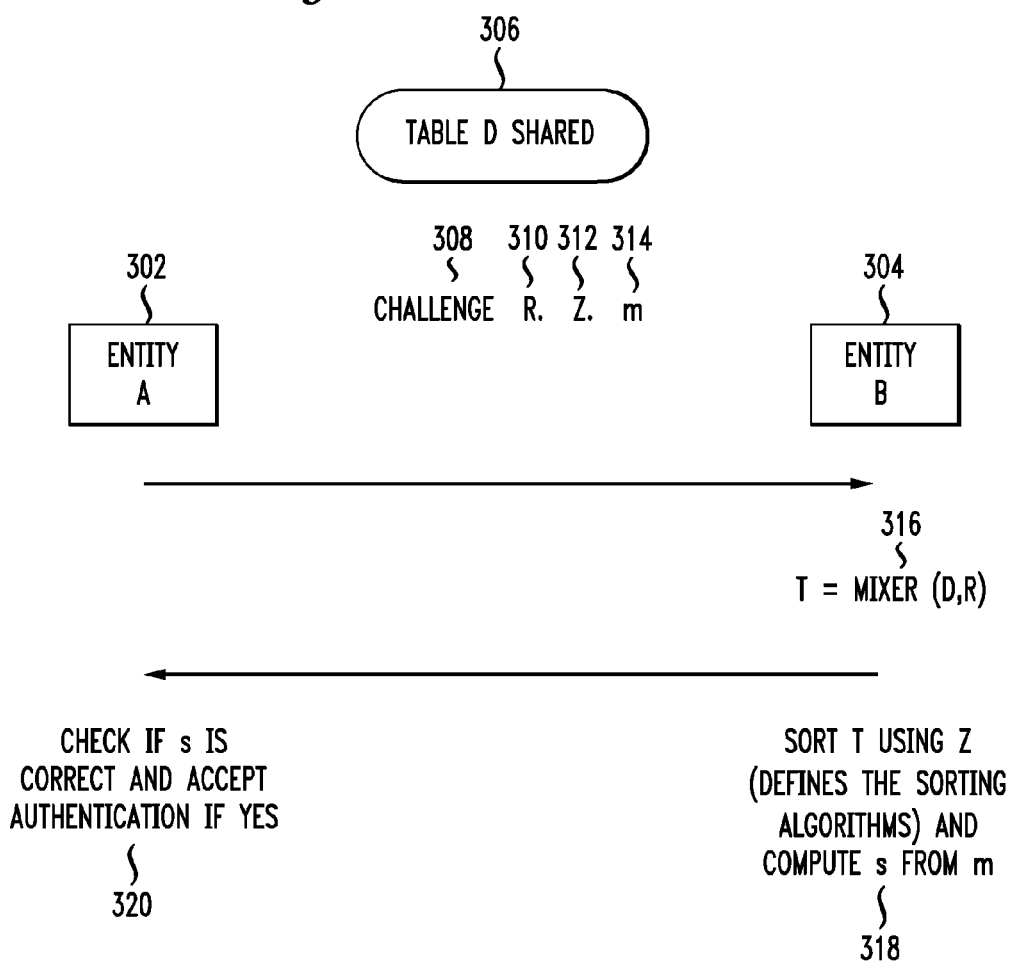

SYSTEM AND METHOD FOR AUTHENTICATION USING A SHARED TABLE AND SORTING EXPONENTIATION

BACKGROUND OF THE INVENTION

1. Field of the Invention

The present invention relates to authentication and more specifically to complex, deterministic authentication based on shared data and sorting algorithms with embedded computations.

2. Introduction

Authentication plays an important role in computer security and in restricted access to sensitive computing resources. Authentication is the process of verifying the credentials or permissions of an entity desiring access to a computing resource such as a file, folder, network resource, CPU time, etc. One common way to authenticate is to verify a username and a password, such as credentials on a local computer or to a remote server. Another common authentication approach relies on biometric authentication, such as speaker recognition, fingerprint scanning, or iris scanning. Other approaches include certificate authentication (a type of asymmetric cryptography) and challenge-response authentication.

An attacker can compromise an authentication scheme by detecting patterns in the signature to surmise and exploit the authentication process or by replaying sniffed traffic. Malicious persons use constantly improving technology to compromise authentication schemes, requiring authentication processes to efficiently produce signatures with unique, ever more complex, and ever more random approaches. Accordingly, what is needed in the art is an improved way to authenticate entities.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for authentication using a shared table. One method includes receiving an authentication challenge from a first entity, the authentication challenge comprising (i) an accumulator, (ii) lists of elements in a shared table, and (iii) a list of sorting algorithms, including a usage order for the sorting algorithms. Each sorting algorithm in the list of sorting algorithms is associated with one of the lists of elements and modified to include embedded instructions operating on the accumulator. The method further include generating a temporary table for each list of elements in the shared table by copying elements from the shared table as indicated in each respective list of elements, each temporary table being associated with one sorting algorithm in the list of sorting algorithms, sorting each generated temporary table with the associated sorting algorithm, thereby updating the accumulator with the embedded instructions, and transmitting the updated accumulator to the first entity for authentication.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates an example method embodiment;
and
FIG. 3 illustrates an authentication system flow.

DETAILED DESCRIPTION

Figure 1:
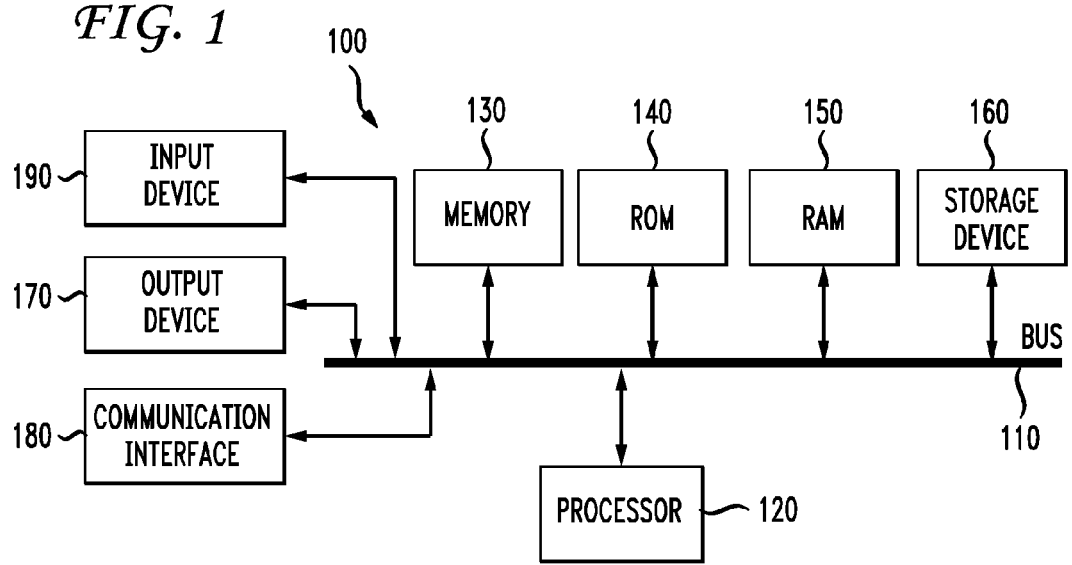
FIG. 1 illustrates an example system embodiment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a central processing unit (CPU) 120 and a system bus 110 that couples system components including the system memory such as read only memory (ROM) 140, random access memory (RAM) 150, and other system memory 130 to the CPU 120. The invention may operate on a computing device with more than one CPU 120 or on a cluster of networked computing devices. The system bus 110 may be any of several types of bus structures including a memory bus or memory controller, a peripheral bus, and a local bus using any of a variety of bus architectures. A basic input/output (BIOS) stored in ROM 140 or Extensible Firmware Interface (EFI) can provide the basic routine that helps to transfer information between elements within the computing device 100, such as during start-up. The computing device 100 further includes storage devices 160 such as magnetic disk storage, optical disk storage, tape drive, solid-state media or the like. The storage device 160 is connected to the system bus 110 by a drive interface. The storage devices provide nonvolatile storage of computer-readable instructions, data structures, program modules and other data for the computing device 100. The basic components are known to those of skill in the art and appropriate variations are contemplated as needed. Although the exemplary environment described herein employs the hard disk, it should be appreciated by those skilled in the art that a cable or wireless signal containing a bit stream and the like, may also be used in the exemplary operating environment.

To enable user interaction with the computing device 100, an input device 190 can represent multiple devices, such as a microphone, a touch-sensitive surface, keyboard, pointing device, barcode reader, biometric scanner, accelerometer and so forth. The device output 170 can also be one or more of a number of output mechanisms known to those of skill in the art. The communications interface 180 generally governs and manages the user input and system output. The invention can operate on any hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results.

The logical operations of the various embodiments are implemented as: (1) a sequence of computer implemented steps, operations, or procedures running on a programmable circuit within a computer, (2) a sequence of computer implemented steps, operations, or procedures running on a specific-use programmable circuit; and/or (3) interconnected machine modules or program engines within the programmable circuits.

Having disclosed various system components, the disclosure turns to the exemplary method embodiment as shown in FIG. 2 for authentication using a shared table. For the sake of simplicity, the method is discussed in terms of a system configured to practice the method. The system involves two entities, informally referred to as a client and a server or as an authenticator device and a device to be authenticated. The entities can be computing devices such as desktop computers, laptop computers, gaming consoles, digital audio players, personal digital assistants, smart phones, software modules, or any combination thereof. The system receives an authentication challenge from a first entity, the authentication challenge includes an accumulator, lists of elements in a shared table, and a list of sorting algorithms, each sorting algorithm in the list of sorting algorithms being associated with one of the lists of elements and modified to include embedded instructions operating on the accumulator (202). One example of embedded instructions is exponentiation. An example authentication challenge is {0x1A39BFF7D7983343, [3,1,4,2], [2-12, 31-90, 9-31, 26-65]}. In this example, 0x1A39BFF7D7983343 is the accumulator which can be a randomly initialized value. The accumulator can be virtually any length, although a longer value can pose a higher barrier to would-be attackers. [3,1,4,2] is the list of sorting algorithms, referenced by index number. The second entity can apply a mixing function to deterministically generate additional values to include when performing the modified sorting algorithms. The list of sorting algorithms can be a list of function pointers (if used locally in the same process) or a list of function names, such as Heap Sort, Shell Sort, Quicksort. The third section uses indices of elements in the shared table. In this example, sorting algorithm #3 will sort elements 2-12 from the shared table; sorting algorithm #1 will sort elements 31-90 from the shared table; sorting algorithm #4 will sort elements 9-31 from the shared table; and sorting algorithm #2 will sort elements 26-65 from the shared table. Although this example demonstrates contiguous ranges of elements, elements in the lists can be non-contiguous and can be in any order, such as [(29, 34, 11, 55, 15, 98), (35, 12, 21, 50, 89, 76, 49, 51), (88, 69, 33)]. However, the order of elements impacts the final result. The challenge indicates one algorithm for each list of elements in the challenge.

The system can obfuscate the challenge, the list of sorting algorithms, and/or the lists of elements in the shared table in order to deter would-be attackers and increase the effort required to reverse engineer the authentication scheme. Even if the challenge is successfully reverse engineered, it is meaningless without the shared table and the properly configured and modified sorting algorithms. In one aspect, the list of sorting algorithms is predefined and shared between the first entity and a second entity. The system can update the list of sorting algorithms with new sorting algorithms received from the first entity. For example, to increase complexity or to enhance existing algorithms with faster performing ones, the first entity can transmit updates to the list of sorting algorithms or transmit entirely new algorithms. In one aspect, either entity or a third party generates the shared table purely at random.

In one variation, the challenge can include multiple values for accumulator initialization. In that case, the challenge must also indicate which accumulator(s) to use for each sorting algorithm. The sorting algorithms can include instructions to modify one or more accumulator. At the end, the system can add, subtract, XOR, or otherwise manipulate one or more of the multiple accumulators to transmit to the first entity for authentication.

The system generates a temporary table for each list of elements in the shared table by copying elements from the shared table as indicated in each respective list of elements, each temporary table being associated with one sorting algorithm in the list of sorting algorithms (204). The system creates a set of temporary tables from the shared table as indicated by the lists of elements. The system is then free to sort the temporary tables, leaving the shared table intact for other uses or for future sorting algorithms.

The system sorts each generated temporary table with the associated sorting algorithm, thereby updating the accumulator with the embedded instructions for exponentiation (206). The sorting algorithms each include embedded instructions to modify the accumulator. In one embodiment, the system performs each sort as indicated by the list of sorting algorithms in the order received and the accumulator is updated accordingly. Other embodiments exist which perform sorts in some obfuscated manner, such as first sorting odd-numbered algorithms in ascending order, then sorting even-numbered algorithms in descending order. The system transmits the updated accumulator to the first entity for authentication (208). In one aspect, the first entity performs the same operations in parallel to verify the updated accumulator sent by the system.

In another aspect, the system further applies a shared secret mixer function to each generated temporary table. The system can modify the mixer function after sorting each generated temporary table or after each authentication attempt. One potential mixer function is an "exclusive or" bitwise operation with a randomly selected bit pattern that is the same at the receiving side and the sending side. Another potential mixer function is a permutation function of the elements. In situations where the temporary tables contain too few elements to sort effectively, the mixer function can also create more data deterministically based on the existing data in the temporary table using an expansion function.

FIG. 3 illustrates an authentication system flow where Entity A 302 authenticates Entity B 304 by sending a challenge 308 to Entity B 304. The system 300 includes Entity A 302, Entity B 304, and a shared table D 306 available to both Entity A 302 and Entity B 304. These entities can be personal computers, servers, PDAs, digital audio players, smart phones, or any other computing device requiring and/or providing authentication services. Each entity can automatically authenticate as instructed by software or as instructed by a human operator. In one example scenario, Entity A 302 and Entity B desire to exchange a mutual session key to encrypt further communication. In another example scenario, Entity A 302 is a master server and Entity B 304 is a client computer seeking authentication. Other scenarios exist and will be recognized by those of skill in the art. The shared table D 306 can be stored in different ways. For example, each entity can store a local copy of the shared table. Each entity can access the shared using a common repository. Entity A 302 can even transmit the shared table, provided it is not too large, as part of the challenge 308. Entity A 302 transmits a challenge 308 R 310 to Entity B 304 including a set Z 312 that can include Z1 describing the order of use of sorting algorithms and Z2 describing subsets of elements to sort for each algorithm, and an accumulator m 314. One example of Z1 and Z2 is "(BubbleSort, elements 1-25), (ShellSort, elements 2, 7, 19, 22, and 36), (RadixSort, elements 16-36), (BubbleSort, elements 20-41)". Z2 can indicate element subsets of the same size or of variable size. The element subsets can each be the same.

Entity B 304 executes a mixer function 316 using the received challenge R 310 and the shared table D 306 as parameters to generate a temporary table T 316 for each sorting algorithm in set Z1. The mixer function is a shared secret function between Entity A 302 and Entity B 304. The mixer function can perform a permutation operation on elements indicated in the challenge. The mixer function can create more data for the temporary table deterministically such that the table contains sufficient data to sort with the algorithms indicated in set Z1. Entity B 304 then sorts the elements of each temporary table T 318 using the algorithms in set Z1 in series and the respective subsets of elements in set Z2. Each sort algorithm is modified to perform an embedded operation, such as an exponentiation function, on the accumulator m 314. Entity B 304 calculates a final result s based on the exponentiated accumulator m 314 and transmits the final result s to Entity A 302 for verification 320. Entity A 302 authenticates Entity B 304 if the final result s matches an expected value.

Each modified sort algorithm can include two functions, updateAccM and updateAccS. The names of these functions represent 'update accumulator multiplication' and 'update accumulator squaring'. The placements of these two functions are for illustrative purposes only and are not limiting. These functions are exemplary; the system can embed other functions as well. These functions can be placed in any location in the algorithm as many times as desired. Multiple sort algorithms of the same type can implement a different variation of the two functions. Sort algorithms can include more or less than two instances of updateAccM and/or updateAccS. In one example, where p is an 1 bit prime number, function updateAccM(m, s) can be s=s*m mod p, and updateAccS(s) can be $s=s^2$ mod p. In another example implementing classical elliptic curve cryptography where m is a multiple of the base point on the curve, updateAccM(m, s) can be s=s+m on the curve, and updateAccS(s) can be s=2*s on the curve. In this case, m and s represent points on the curve. For instance, m and s can be 32-bit words and the number of points can be (m+1) or (n+1). In one embodiment, the system defines updateAccM(m, s) and updateAccS(s) for $m=(m_0, \ldots, m_n)$ and $s=(s_0, \ldots, s_n)$ and updates each $s_i$. The system can perform the same function for elliptic curves. $m_i$ and $s_i$ can be of any size. Some example embodiments of modified sorting algorithms include the following:

```
bubbleSort1(A: list of sortable items, m) {
    s = iD
    for each i from 0 to length(A) - 1 {
        for each j from length(A) - 1 to i + 1 {
            updateAccS(s)
```

```
            if A[j -1] > A[j] then {
                permute(A[j - 1], A[j])
                updateAccM(m, s)
            }
        }
    }
    return s
}
bubbleSort2(A: list of sortable items, m) {
    n = length(A)
    swapped = true
    s = iD
    while swapped {
        swapped = false
        n = n - 1
        for each i in 0 to n do:
            updateAccS(s)
            if A[i] > A[i + 1] then
                swap(A[i], A[i + 1])
                swapped := true
                updateAccM(m, s)
            }
    }
    return s
}
selectionSort(A: list of sortable items, m) {
    s = iD
    for i from 0 to n-2 {
        min = i
        updateAccS(s)
        for j from (i + 1) to n-1 {
            if A[j] < A[min] {
                min = j
            }
        }
        permute(A[i], A[min])
        if(min != i+1)
            updateAccM(m, s)
    }
    return s
}
insertionSort(A: list of sortable items, m) {
    s = iD
    for i from 1 to length[A] - 1 {
        value = A[i]
        j = i - 1
        updateAccS(s)
        while(j ≧ 0 and A[j] > value) {
            A[j + 1] = A[j]
            j = j - 1
        }
        A[j + 1] = value
        if(value != A[i])
            updateAccM(m, s)
    }
    return s
}
shellSort(A[ ], size, m) {
    increment = size / 2
    s = iD
    while(increment > 0) {
        updateAccS(s)
        for i from increment to size - 1 {
            j = i
            temp = A[i]
            while((j >= increment) && (A[j-increment] > temp)) {
                A[j] = A[j - increment]
                j = j - increment
            }
            A[j] = temp
            if(tmp != A[i])
                updateAccM(m, s)
        }
        if(increment == 2)
            increment = 1
        else
            increment = (int) (increment / 2.2)
    }
    return s
```

-continued

```
}
//Before calling, set s to 1
mergeSort(A, m, s) {
    if length(A) ≦ 1
        return A
    middle = length(A) / 2
    for each x in A up to middle
        add x to left
    for each x in A after middle
        add x to right
    left = mergeSort(left, m, s)
    right = mergeSort(right, m, s)
    result = merge(left, right, m, s)
    return result
}
The merge function referred to above is:
merge(a, b, m, s) {
    j = 0
    while(i < length(a)) and (j < length(b)) {
        updateAccS(s)
        if a[i] < b[j] {
            add a[i] to result
            i++
        }
        else {
            add b[j] to result
            j++
            updateAccM(m, s)
        }
    }
    while i < length(a) {
        add a[i] to result
        i++
    }
    while j < length(b) {
        add b[j] to result
        j++
    }
    return result
}
Another version of the merge function referred to above is:
merge2(left,right, m, s) {
    while length(left) > 0 and length(right) > 0 {
        updateAccS(s)
        if first(left) ≦ first(right) {
            append first(left) to result
            left = rest(left)
        }
        else {
            updateAccM(m, s)
            append first(right) to result
            right = rest(right)
        }
    }
    if length(left) > 0
        append left to result
    if length(right) > 0
        append right to result
    return result
}
function heapSort(a, count, m, s) {
    heapify(a, count, m, s)
    end := count − 1
    while end > 0 {
        swap(a[end], a[0])
        end−−
        siftDown(a, 0, end, m, s)
    }
}
The heapify function referred to above is:
heapify(a,count, m, s) {
    s = iD
    start := (count − 1) / 2
    while start ≧ 0 {
        siftDown(a, start, count − 1, m, s)
        start := start − 1
    }
}
The siftDown function referred to above is:
siftDown(a, start, end, m, s) {
    root := start
    while root * 2 + 1 ≦ end {
        child := root * 2 + 1
        updateAccS(s)
        if child < end and a[child] < a[child + 1]
            child := child + 1
        if a[root] < a[child] {
            updateAccM(m, s)
            swap(a[root], a[child])
            root := child
        }
        else
            return
    }
}
//Before calling, set s to 1
quickSort(array, m, s) {
    if length(array) ≦ 1
        return array
    Select a pivot value pivot from array deterministically depending on
        the inputs
    for each x in array {
        updateAccS(s)
        if x ≦ pivot then append x to less; updateAccM(m, s);
        else append x to greater
    }
    return concatenate(quickSort(less, m, s), pivot, quickSort(greater,
        m, s))
}
bucketSort(array, n, m, s) {
    buckets = new array of n empty lists
    s = iD
    for i = 0 to (length(array)−1) do
        insert array[i] into buckets[msbits(array[i], k)]
    for i = 0 to n − 1 do
        nextSort(buckets[i] m, s)
    return the concatenation of buckets[0], ..., buckets[n−1]
}
```

The principles described herein are applicable to visual cryptography where the initial table is generated on the Entity A side and physically given to Entity B based on a printed version or a digital image. The principles described herein can also be used as a derivation function because Entities A and B are able to compute the same value on both sides, given an accumulator shared on both sides. This shared value can function as a key in an encryption process to exchange data.

In some cases, the list of sorting algorithms includes variations of the same fundamental sorting algorithm, such as bubble sort, but with different placement of the modified sections. For instance, one list of algorithms can include a first bubble sort and a second bubble sort where the updateAccS(s) line and the updateAccM(m,s) line are swapped. When sorting with the second bubble sort, the swapped lines would execute in a different order to produce a different exponentiation result. If the swapped lines performed addition or multiplication, the end result would be the same despite the order of execution because addition and multiplication are commutative, meaning that the order of operands does not matter. As a simple example, $(2+8)=10=(8+2)$ and $(3*7)=21=(7*3)$. Exponential functions are not commutative, meaning that order of operations affects the result, sometimes significantly. For example, $2^8=256$ while $8^2=64$. The system can refer to multiple sorting algorithms of the same type with different exponentiation functionality using unique identifiers (e.g. bubbleSort1 (itemsToSort, m), bubbleSort2 (itemsToSort, m) and so on) or using an array of function pointers (e.g. *bubbleSorts[0] (itemsToSort, m), *bubbleSorts[1] (itemsToSort, m), and so on). The system can refer to sorting algorithms using a shared array of function pointers.

The authentication method disclosed herein can be combined in whole or in part with other known authentication schemes. For example, the system can be combined with a biometric authentication module or with a username and password authentication module. The system can obfuscate the representations of the shared table, the challenge, the mixer function, the sorting algorithms, the temporary table, and other components in computer memory using one or more techniques to enhance the difficulty of reverse engineering attempts and/or attempts to crack the authentication. In a large sense, the disclosed method protects values by mixing them and performing operations on an accumulator, provides enhanced security through the embedded operations distributed across multiple sorting algorithms, and provides enhanced security for the original shared table by generating temporary tables with the mixer function.

Embodiments within the scope of the present invention include computer-readable media for storing computer-executable instructions or data structures. Such computer-readable media can be any available, computer-accessible media, such as RAM, ROM, optical disks, magnetic storage devices, or any other medium which can be used to carry or store desired program code means in the form of computer-executable instructions or data structures. When information is transferred over a network (hardwired, wireless, or a combination thereof) to a computer, the connection is a computer-readable medium. Combinations of the above are within the scope of the computer-readable media.

Computer-executable instructions include, for example, instructions and data which cause one or more computing device to perform a certain function. Generally, program modules include routines, functions, programs, objects, components, and/or data structures that perform or implement particular tasks or data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked through a communications network. In a distributed computing environment, program modules may be located in both local and remote memory storage devices.

The various embodiments described above are provided by way of illustration only and should not be construed to limit the invention. For example, the principles herein may be applied to any software program which must be resistant to reverse engineering. The principles herein can authenticate entities alone or in combination with nearly any other authentication scheme, such as a username/password and/or biometric authentication. The principles described herein can also apply to visual cryptography. Those skilled in the art will readily recognize various modifications and changes that may be made to the present invention without following the example embodiments and applications illustrated and described herein, and without departing from the true spirit and scope of the present invention.

We claim:

1. A method comprising:

receiving an authentication challenge from an entity, the authentication challenge comprising an accumulator with an initial value, lists of elements in a shared table, a list of sorting algorithms, and an order in which the list of sorting algorithms are to be performed, each sorting algorithm in the list of sorting algorithms being associated with one of the lists of elements and modified to include embedded instructions operating on the accumulator;

generating a temporary table for each list of elements in the shared table by copying elements from the shared table as indicated in each list of elements, each temporary table having an associated sorting algorithm from the list of sorting algorithms;

sorting each temporary table with the associated sorting algorithm, thereby updating the accumulator with the embedded instructions by chaining a result of each associated sorting algorithm according to the order to yield an updated accumulator; and transmitting the updated accumulator to the entity for authentication.

2. The method of claim 1, further comprising applying a shared mixer function to each temporary table, wherein the shared mixer function accepts a random value as input.

3. The method of claim 2, further comprising modifying the mixer function after sorting each temporary table.

4. The method of claim 2, wherein the mixer function is an "exclusive or" bitwise operation with a same randomly selected bit pattern at a receiving side and a sending side.

5. The method of claim 2, wherein the mixer function creates more data using an expansion function for each temporary table.

6. The method of claim 2, wherein the mixer function permutes elements in the lists of elements.

7. The method of claim 1, wherein at least one of the challenge, the list of sorting algorithms, and the lists of elements in the shared table is obfuscated.

8. The method of claim 1, wherein the list of sorting algorithms is predefined and shared between the first entity and a second entity.

9. The method of claim 8, further comprising updating the list of sorting algorithms at the second entity with new sorting algorithms received from the first entity.

10. The method of claim 1, wherein the embedded instructions operating on the accumulator are instructions for modular exponentiation.

11. The method of claim 1, wherein the embedded instructions operating on the accumulator are instructions for scalar point multiplication on an elliptic curve.

12. A method of authentication using a shared table, the method comprising:

sending an authentication challenge to an entity, the authentication challenge comprising an accumulator with an initial value, lists of elements in a shared table, a list of sorting algorithms, and an order in which the sorting algorithms are to be performed, each sorting algorithm in the list of sorting algorithms being associated with one of the lists of elements and modified to include embedded instructions operating on the accumulator;

receiving a response from the entity generated by:

(1) generating a temporary table for each list of elements in the shared table by copying elements from the shared table as indicated in each list of elements, each temporary table having an associated sorting algorithm from the list of sorting algorithms;

(2) sorting each temporary table with the associated sorting algorithm, thereby updating the accumulator with the embedded instructions by chaining a result of each associated sorting algorithm according to the order to yield an updated accumulator; and (3) transmitting the response based on the updated accumulator; and authenticating the entity if the response is verified.

13. The method of claim 12, wherein the response is further generated by applying a shared mixer function to each temporary table.

14. The method of claim 13, wherein the mixer function is an "exclusive or" bitwise operation with a same randomly selected bit pattern at a receiving side and a sending side.

15. The method of claim 13, wherein the mixer function creates more data using an expansion function for each temporary table.

16. The method of claim 12, wherein the list of sorting algorithms is predefined and shared between the entity and another entity.

17. The method of claim 16, further comprising sending an updated list of new sorting algorithms to the entity.

18. A system for authentication using a shared table, the system comprising:

a first module configured to receive an authentication challenge from an entity, the authentication challenge comprising an accumulator with an initial value, lists of elements in a shared table, a list of sorting algorithms, and an order in which the list of sorting algorithms are to be performed, each sorting algorithm in the list of sorting algorithms being associated with one of the lists of elements and modified to include embedded instructions operating on the accumulator;

a second module configured to generate a temporary table for each list of elements in the shared table by copying elements from the shared table as indicated in each list of elements, each temporary table having an associated sorting algorithm from the list of sorting algorithms;

a third module configured to sort each temporary table with the associated sorting algorithm, thereby updating the accumulator with the embedded instructions by chaining a result of each associated sorting algorithm according to the order to yield an updated accumulator; and a fourth module configured to transmit the updated accumulator to the entity for authentication.

19. The system of claim 18, further comprising a fifth module configured to apply a shared mixer function to each temporary table, the shared mixer function creating more data using an expansion function.

20. A system for authentication using a shared table, the system comprising:

a first module configured to send an authentication challenge to an entity, the authentication challenge comprising an accumulator, lists of elements in a shared table, a list of sorting algorithms, and an order in which the list of sorting algorithms are to be performed, each sorting algorithm in the list of sorting algorithms being associated with one of the lists of elements and modified to include embedded instructions operating on the accumulator;

a second module configured to receive a response from the entity generated by:

(1) generating a temporary table for each list of elements in the shared table by copying elements from the shared table as indicated in each list of elements, each temporary table having an associated with one sorting algorithm from the list of sorting algorithms;

(2) sorting each temporary table with the associated sorting algorithm, thereby updating the accumulator with the embedded instructions by chaining a result of each associated sorting algorithm according to the order; and a third module configured to authenticate the entity if the received response is verified.

* * * * *